F. E. MARKLEY.
REPLANTER ATTACHMENT FOR CULTIVATORS.
APPLICATION FILED OCT. 13, 1909.
977,115.
Patented Nov. 29, 1910.
2 SHEETS—SHEET 1.
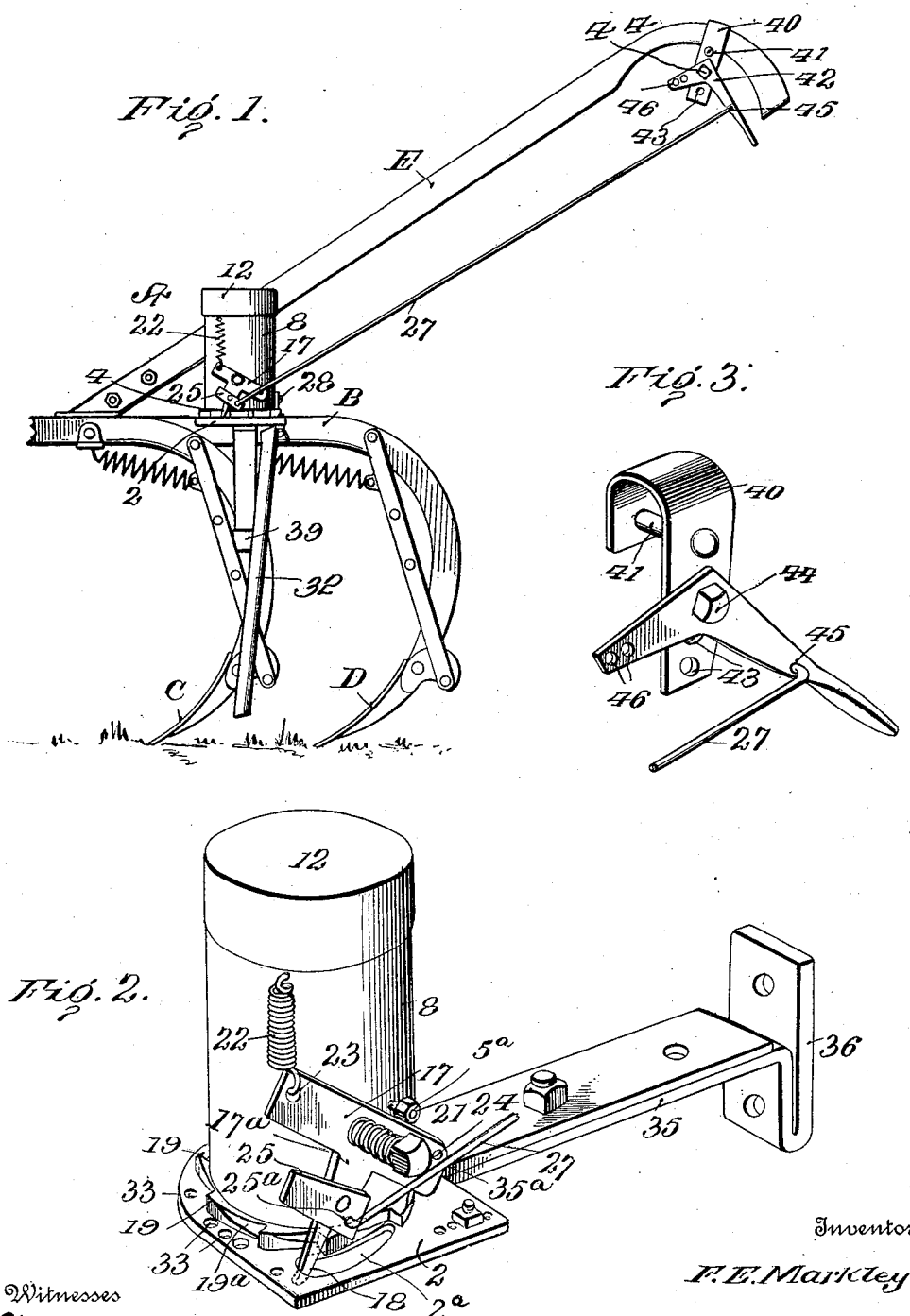

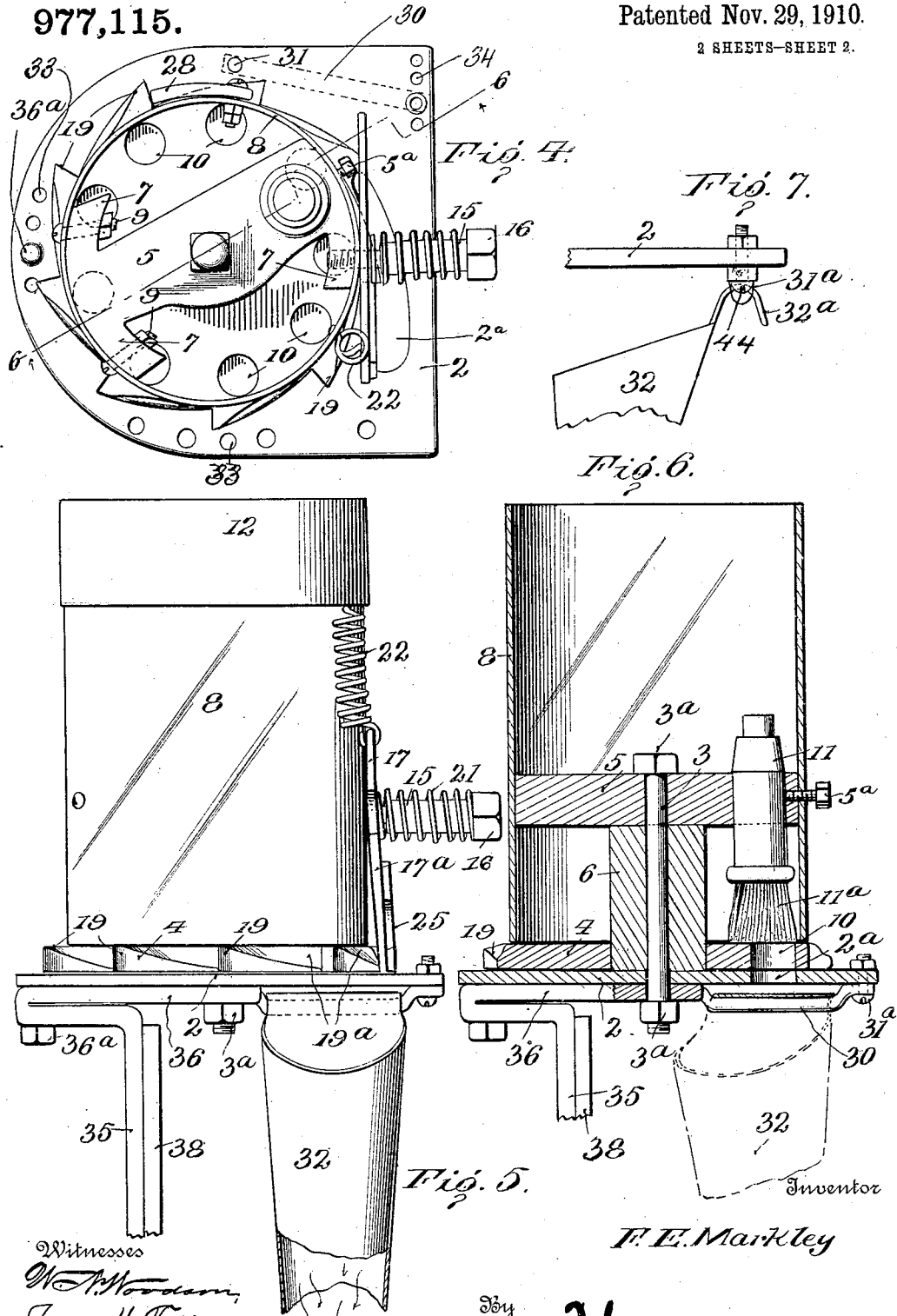

UNITED STATES PATENT OFFICE.

FRANK E. MARKLEY, OF PAOLA, KANSAS.

REPLANTER ATTACHMENT FOR CULTIVATORS.

977,115. Specification of Letters Patent. Patented Nov. 29, 1910.

Application filed October 13, 1909. Serial No. 522,497.

*To all whom it may concern:*

Be it known that I, FRANK E. MARKLEY, citizen of the United States, residing at Paola, in the county of Miami and State of Kansas, have invented certain new and useful Improvements in Replanter Attachments for Cultivators, of which the following is a specification.

My invention relates to replanters, and particularly to a cultivator for cultivating and replanting corn, whereby corn can be replanted at the same time that it is cultivated, thus saving time and labor.

The object of the invention is to provide a replanting attachment which may be applied to any cultivator and which shall be certain and positive in action and wherein the parts may be adjusted to suit variations in size or construction of cultivators.

A further object is to provide a very simple and effective device for replanting, wherein the various parts may be repaired or replaced, and wherein the parts are of such simplicity as not to readily get out of order.

The invention consists in the details of construction and arrangement of parts set forth in the following specification and more specifically stated in the claims appended.

For a full understanding of the invention and the merits thereof, and to acquire a knowledge of the details of construction, reference is to be had to the following description and accompanying drawings, in which:

Figure 1 is a fragmentary side elevation of a cultivator with my attachment applied thereto; Fig. 2 is an enlarged perspective view of the replanter mechanism; Fig. 3 is a perspective detail view of the clip and operating handle; Fig. 4 is a plan view of the feeding device, the cover of the seed-containing can being removed; Fig. 5 is a side elevation of the replanter; Fig. 6 is a transverse section on line 6—6 of Fig. 4; and, Fig. 7 is a fragmentary detail view showing the means for supporting the seed spout.

Corresponding and like parts are referred to in the following description and indicated in all the views of the drawings by the same reference characters.

Referring to these figures, A designates a cultivator of the usual character, B the beam thereof, C the inside forward shovel, D the rear shovel, and E the handle.

My attachment consists of a bed plate 2 which is supported on the cultivator, as will be later described. Through the bed plate passes a central bolt 3 surrounded by a sleeve 6 which rests upon the upper face of the bed plate. Rotatably mounted on the lower end of the sleeve, and resting on the bed plate, is the ratchet-toothed disk 4 having a plurality of seed-receiving chambers 10 through it. Mounted on the sleeve 6 is the transversely extending can-carrier bar 5, the ends of which are laterally extended to form arcuate faced heads, as at 7. Supported on the can carrier bar 5 is the seed receptacle or can 8 which is bolted to the heads 7 of the bar by bolts 9. The lower edge of the can 8 approximates the upper faces of the disk 4, but does not quite touch the same, so that the disk has perfect freedom of rotation. Mounted in the transverse can-carrying bar 5, and immediately above one of the chambers 10 of the disk 4, is the brush handle 11, having projecting therefrom the bristles 11$^a$, the area of the bristles being sufficient to entirely obstruct that one of the openings 10 which happens to be immediately beneath the brush. The bristles 11$^a$ act as a shield to prevent the passage of excess seed into the opening 10 covered by the brush and in alinement with the opening 2$^a$ through the bed plate 2, whereby the seed passes to the directing chute. The brush handle 11 is held in place in the can carrier bar 5 by a set screw 5$^a$ which passes through the side of the can and assists in holding it in place. This can be covered by a removable top 12.

Attached to that head 7 which is adjacent to the brush 11, and projecting out through the side of the can is a stud bolt or spindle 15 having a head 16 at one end. Mounted upon the stud bolt is the three-armed dog 17 which has a finger 18 extending from the lower end of its downwardly extending arm 17$^a$ through an elongated slot 2$^a$ in the base plate in position to engage with one of the teeth 19 on the ratchet disk 4. Surrounding the spindle 15 is a coil spring 21 which presses inwardly on the dog 17 and keeps it in such position that the finger will engage with the teeth 19.

22 designates a coil spring which is attached at one end to the can in any suitable manner, and at its other end is engaged in the perforation 23 in the dog 17, so that the dog is normally held in the position shown in Fig. 2. The opposite end of the dog 17 is provided with a perforation 24 whereby the dog may be connected to the operating device, as will be later explained. The lower end of the arm 17$^a$ has attached to it the angularly projecting stop plate 25 whose lower edge is adapted to contact with the cut-away portion 19$^a$ of the teeth 19. The rear corner of the stop plate is perforated, as at 25$^a$, said perforation being alternately used with the perforation 24 for engagement with a rod 27 which passes upward to the finger-operating mechanism on the handle of the cultivator. Pivotally mounted on the side of the can 8 is a gravity dog 28 which normally depends into the path of movement of the teeth 19 in such position as to prevent a movement of the plate 4 in one direction, but permit a movement of the plate in the other direction.

The bottom of the plate 2, adjacent to the opening 2$^a$, is provided with the transversely extending bar 30 which is spaced from the under side of the plate 2, the bar being bowed for this purpose. One end of the bar is pivoted, as at 31, while the other end of the bar is provided with a screw 31$^a$ adapted to be inserted into one of a plurality of holes 34, whereby the bar 30 may be adjusted nearer to or farther from the opening 2$^a$.

32 designates the seed chute or metal tube by which the seed is conducted from the opening 2$^a$ to the point at which the seed is to be dropped. This tube is tapered toward its lower end, and at its upper end is provided with the hooked portion 32$^a$ which engages over the bar 30. The lower end of the chute 32 is to be attached to the cultivator in any desired manner after the chute has been properly adjusted.

The margin of the plate 2 is provided with a plurality of bolt holes 33, whereby the plate 2 with the planter mechanism thereon may be rotatably adjusted upon the planter support 35. This consists of a bar adapted to be clamped to the beam of a cultivator, one end of the bar being bent at right angles and then returned upon itself, as at 36. Under ordinary circumstances, the bar 35 is vertical and the portion 36 is horizontal, and the plate 2 rests upon the upper face of the portion 36. The bolt 3 passes through the plate 2 and through the extremity of the portion 36, this bolt being provided at its opposite ends with the nuts 3$^a$. The outside extremity of the portion 36, where the metal of the bar is folded, is also perforated for the passage of the bolt 36$^a$, this bolt being adapted to pass through any of the perforations 33, thus providing for a rotative adjustment of the bed plate 2 upon the support.

38 designates an auxiliary bar which may be bolted either in alinement with the bar 35, or turned at such angle thereto that it may be conveniently attached to the beam or frame of the cultivator and act to brace the support. Clamps 39 may be used to clamp the bars 35 and 38 to the cultivator beam. The planter support can also be secured in a horizontal position, as shown in Fig. 2, by reversing the ends of the planter support 35 and bolting the extremity 35$^a$ of the support to the bolt 3, the edge of the plate 2 being bolted in the second hole from the end of the supporting bar 35. This adjustment permits of the planter being attached to the cultivator by placing the bar 35 across the beam of the cultivator, which is very necessary in some makes of cultivators. Attached to the handle of the cultivator is the clip 40 which embraces the handle and is held in place by the transverse bolt 41. Pivotally mounted upon the clip 40 is the trigger 42 having the shape of a bell crank lever. The clip 40 is provided with a plurality of longitudinally disposed holes 43 in which the bolt 44 of the trigger may be adjusted. The long arm of the trigger forms a handle whereby it is operated, and is provided with a hole 45 for engagement with the wire, rod, or other connection 27. The short arm of the lever is also provided with a plurality of holes 46 for like engagement with the rod 27. Where the device is used on walking cultivators, the rod 27 is connected to the hole in the handle portion of the trigger, but where used on riding cultivators, the rod 27 is connected to the holes in the short end of the trigger.

The operation of my invention will be obvious. As the cultivator is moved along the row, the trigger is operated by reciprocating the same, and this acts to reciprocate the dog 17. A reciprocation of the dog 17 acts to rotate the plate 4 the length of one tooth, which will bring one of the holes 10 in the plate into alinement with the opening 2$^a$, so that the seed which is contained within the walls of this opening 10 is allowed to drop down through the opening 2$^a$ into the spout. In order to prevent any chance of the plate 4 being turned to too great an extent upon a reciprocation of the dog, the dog is provided with the angular stop 25 which has a frictional contact with the periphery of the disk 4 as the disk is being rotated, so that when the dog has reached the end of its movement, the extremity of the stop plate 25 is in contact with the face of the tooth immediately in advance of the tooth being operated upon. Thus, there is no danger of the ratchet disk 4 moving so far around that the openings 10 and 2$^a$ are not in perfect alinement. In order to prevent a return movement of the disk 4 after having been moved one step, the dog 28 is provided which rises as the tooth passes beneath it, but drops when the tooth has passed, and prevents a return movement of the tooth. It will be seen that the spring 21 permits the plate dog 25 to ride upon the outer face of the teeth 19, but to remain in frictional engagement with the face of the teeth at all times. A brush 11 is removably supported in the transverse bar 5, and thus a new brush may be substituted for an old, or the brush may be adjusted downward against the face of the disk 4 as the bristles wear out. The brush permits of an easy movement of the disk 4, but acts effectively to prevent any possible chance of excess seeds passing into the chamber or opening 10 which happens to be beneath the brush.

My invention is simple, compact, can be easily applied to any cultivator, and forms a very effective replanter. The machine can be used for planting all kinds of coarse seeds, such as pumpkins, beans, water melons, squash, etc., and can also be used as an attachment to a lister for planting corn.

While I have shown what I believe to be the most effective details of construction, I do not wish to be limited to these, as it is obvious the construction may be changed in its minor points without departing from the spirit of the invention.

Having thus described the invention, what I claim is:—

1. A mechanism of the class described having a seed receptacle open at its lower end, a rotatable disk closing the lower end of the receptacle, the periphery of the disk projecting beyond the circumference of the receptacle and being formed with ratchet teeth, said disk having a plurality of open-ended chambers in it, a base plate upon which the disk is supported, having an opening with which the openings in the disk successively aline, a guard supported within the receptacle immediately above the opening in the base plate and contacting with the upper face of the rotatable disk, a reciprocating dog pivoted upon the side of the receptacle but having bodily lateral movement, said dog having a downwardly projecting extension engaging with the teeth of the disk, means for reciprocating the dog, and a spring forcing the dog bodily inward toward the receptacle and against the teeth on the periphery of the disk.

2. A mechanism of the character described having a seed receptacle, a rotatable disk closing the lower end thereof and having a plurality of open-ended chambers in it, said disk projecting beyond the circumference of the receptacle and having ratchet teeth on its periphery, a supporting base plate on which the disk rotates, having an opening with which the openings in the disks successively aline, a dog pivoted on the side of the seed receptacle but having free bodily lateral movement away from the receptacle, a spring for resisting the rotative movement of the dog on its pivot, manually operated mechanism for drawing the dog against the force of the spring to engage the teeth on the ratchet disk and turn said disk, a spring forcing the dog bodily inward toward the receptacle and holding the dog in engagement with the toothed periphery of the disk, said spring permitting the dog to move bodily outward to ride over said teeth, and a stop for limiting the movement of the disk when actuated by the dog.

3. A mechanism of the class described, having a seed receptacle, a rotatable disk closing the lower end thereof and having a plurality of open-ended chambers in it, said disk having ratchet teeth upon its periphery, a supporting base plate upon which the disk rotates, having an opening with which the openings in the disk successively aline, a dog pivoted to the side of the seed receptacle, a spring for drawing the dog in one direction, manually actuated mechanism for drawing the dog in the other direction to engage the teeth on the ratchet disk, a spring surrounding the pivot of the dog and forcing the dog inward toward the receptacle, said spring also forcing said dog against the periphery of the disk, but permitting the dog to ride over the said teeth, a stop for limiting the movement of the disk when actuated by the dog, and a pawl engaging with the tooth to prevent a reverse movement of the disk.

4. In mechanism of the class described, a supporting bar, a supporting plate rotatably mounted on the bar and adjusted to any angular position, a bolt passing upwardly from the supporting bar and plate, a supporting sleeve surrounding the bolt and resting upon said plate, said sleeve having outwardly projecting arms, a rotatable disk mounted on the sleeve and supported on the plate, having a plurality of openings through it adapted to aline with an opening in the said supporting plate and being provided with peripheral ratchet teeth, a seed receptacle carried by the arms of said supporting member, a vertically adjustable brush carried upon one of said arms, above the opening through the supporting plate, the bristles of the brush contacting with the upper face of the disk, a three-armed dog pivotally mounted upon the seed receptacle and having a projecting finger engaging with the teeth on the disk, a spring attached to one of said arms and fixed at its other end, hand-actuated means attached to the other of said arms, a stop for limiting the movement of the ratchet disk in one direction, a dog for preventing the movement of the ratchet disk in the other direction, and a chute supported beneath the opening in the supporting plate.

5. In mechanism of the class described, a seed receptacle, a rotatable disk closing the lower end of the receptacle and having a plurality of open-ended chambers in it, a supporting base plate having an opening with which the openings in the disk successively aline, said disk being provided with peripheral ratchet teeth, a three-armed dog pivotally mounted upon the seed receptacle, one of said arms engaging with the ratchet teeth, a spring attached to another of said arms, a hand-actuated device attached to the remaining arm, and a stop projecting from the tooth-engaging arm and adapted, when the arm is moved to rotate the disk, to frictionally engage with a tooth on the disk to prevent too great a movement thereof.

6. A mechanism of the class described, having a seed receptacle, a rotatable disk controlling the passage of seed from said receptacle and having peripheral ratchet teeth, a dog pivoted to the seed receptacle and having yielding engagement with the ratchet teeth, said dog having a downwardly extending arm adapted to engage with the ratchet teeth to rotate the disk as the dog is reciprocated, manually-actuated means attached to the dog for reciprocating it, and a stop plate projecting laterally from the lower end of the downwardly projecting arm and adapted to engage with the face of a tooth as the arm is moved to the limit of motion in one direction to limit the forward movement of the disk.

7. In mechanism of the character described, a seed receptacle, a rotatable disk closing the lower end of the seed receptacle and having a plurality of openings through it, a base plate having an opening with which the openings in the disk are adapted to aline, mechanism for giving a step-by-step rotation to the disk, a chute, and a chute support pivoted at one end to the under face of the base plate, the other end of the support being movable and having means whereby it may be adjusted in any set position.

8. In mechanism of the class described, a seed receptacle, a rotatable disk closing the lower end thereof and having a plurality of openings through it, a base plate having an opening with which the openings in the disk successively aline, a base plate having a central bolt upon which the disk is journaled, the circumference of the plate being provided with a plurality of bolt holes, and a support having pivotal engagement with said central bolt and having openings adapted to aline with the circumferential bolt openings on the base plate, and a bolt connecting the circumference of the base plate with said support.

9. A mechanism of the class described, having a cylindrical seed receptacle, a rotatable disk closing the lower end thereof and having a plurality of open-ended chambers therein, said disk being provided with ratchet teeth upon its periphery, a supporting base plate upon which the disk rotates, having an opening with which the openings in the disk successively aline, a bolt passing through the base plate and up into said seed receptacle, a cross bar extending across the seed receptacle, through which the bolt passes and forming a support for the bolt, a sleeve surrounding said bolt and spacing said cross bar from the base plate, said sleeve forming the axis around which the rotatable disk moves, a dog mounted to engage the teeth of the rotatable disk, and means for operating said dog.

10. A mechanism of the class described, having a cylindrical seed receptacle, a cross bar extending across the seed receptacle and rigidly attached thereto, a base plate, a bolt passing through the base plate and cross bar, a sleeve surrounding the bolt and spacing the cross bar from the base plate, a seed-dropping disk mounted on the base plate and rotatably surrounding said sleeve, a spindle projecting from the exterior of the seed receptacle, a three-armed dog pivotally mounted upon the spindle, a spring surrounding the spindle and forcing the dog inward against the receptacle, a finger on the dog engaging with the seed-dropping disk, a spring attached to the dog for holding it in an inactive position, and hand-actuated means for reciprocating said dog and rotating said disk.

11. In a replanting attachment for cultivators, the combination with a seed holder provided with a seed-dropping mechanism, of a support therefor adapted to be attached to the cultivator, a plate rotatably mounted upon the support and upon which the seed-dropping mechanism moves and is supported, said plate being formed with a series of circumferential holes, and a bolt passing through said supporting bar and adapted to pass into any one of the supporting holes, whereby the plate and seed-dropping mechanism may have any desired angular adjustment.

12. In a replanting attachment for cultivators the combination with a seed holder provided with a seed-dropping mechanism, of a supporting bar upon which the seed holder and dropping mechanism are mounted, said supporting bar having one end thereof bent outward away from the main portion of the bar, then inward upon itself and extended beyond said main portion, the extension being provided with bolt openings.

13. In a replanting attachment for cultivators, the combination with a seed holder provided with a seed-dropping mechanism, a plate upon which the seed-dropping mechanism is supported, and a bolt passing through the plate, forming the axis of the seed-dropping mechanism and holding the seed holder to said plate, of a supporting bar adapted to be attached to a cultivator, said bar having one end thereof outwardly bent, then returned upon itself and extended in the opposite direction beyond the main body of the supporting bar, said extension being provided with an opening for the reception of said bolt, the circumference of the supporting plate being provided with a series of bolt openings, and the outwardly bent portion of the supporting bar being also provided with a bolt opening, and a bolt extending through said outwardly bent portion and into any one of the bolt openings on the circumference of the plate.

14. In a replanting attachment for cultivators, the combination with a cylindrical seed holder, a base plate, a rotatable seed-dropping disk mounted on the base plate, a cross bar in the seed holder, and a bolt passing through the base plate, forming the axis of the rotatable disk, and extending up through said cross bar, of a supporting bar therefor, adapted to be attached to a cultivator, said bar at one end being outwardly bent at right angles to the main body of the bar, then returned upon itself and extended at right angles to the main body of the bar and beyond the same, said extension being provided with an opening adapted to receive the bolt connecting the base plate and seed-holding mechanism, the circumference of the base plate being provided with a series of openings, and the outwardly turned portion of the supporting bar being also provided with a bolt opening, and a bolt adapted to pass through said openings to hold the base plate in any angularly adjusted position upon the supporting bar.

In testimony whereof I affix my signature in presence of two witnesses.

FRANK E. MARKLEY. [L. S.]

Witnesses:
 FRANK J. MERRILL,
 W. T. JOHNSTON.